A. G. PAUL.
HEATING SYSTEM.
APPLICATION FILED MAY 15, 1900.
1,045,603.
Patented Nov. 26, 1912.
3 SHEETS—SHEET 3.
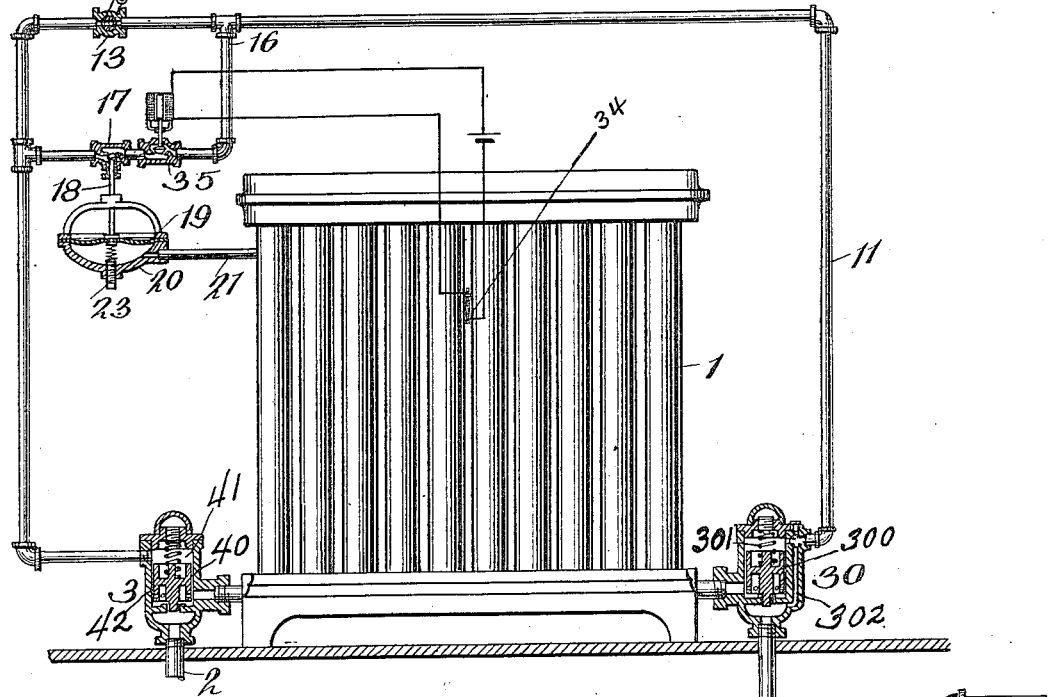
Fig. 3,
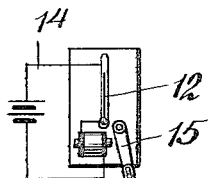
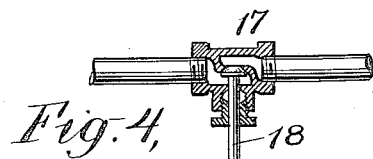
Fig. 4,
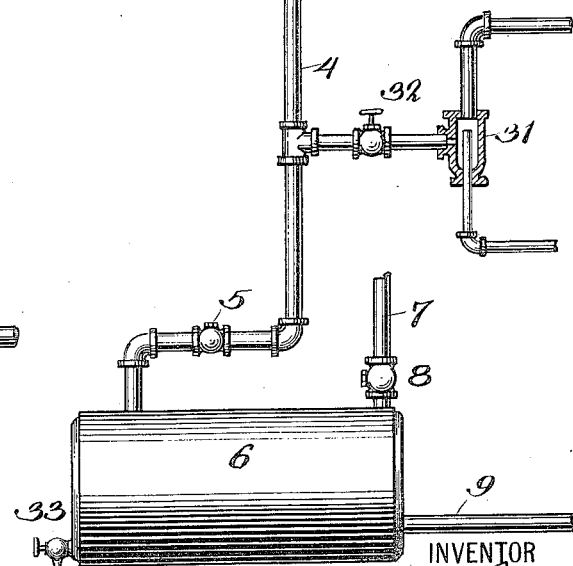
WITNESSES:
John O. Templer.
Wm J Dolan
INVENTOR
Andrew G. Paul
BY
Kenyon & Kenyon,
ATTORNEY

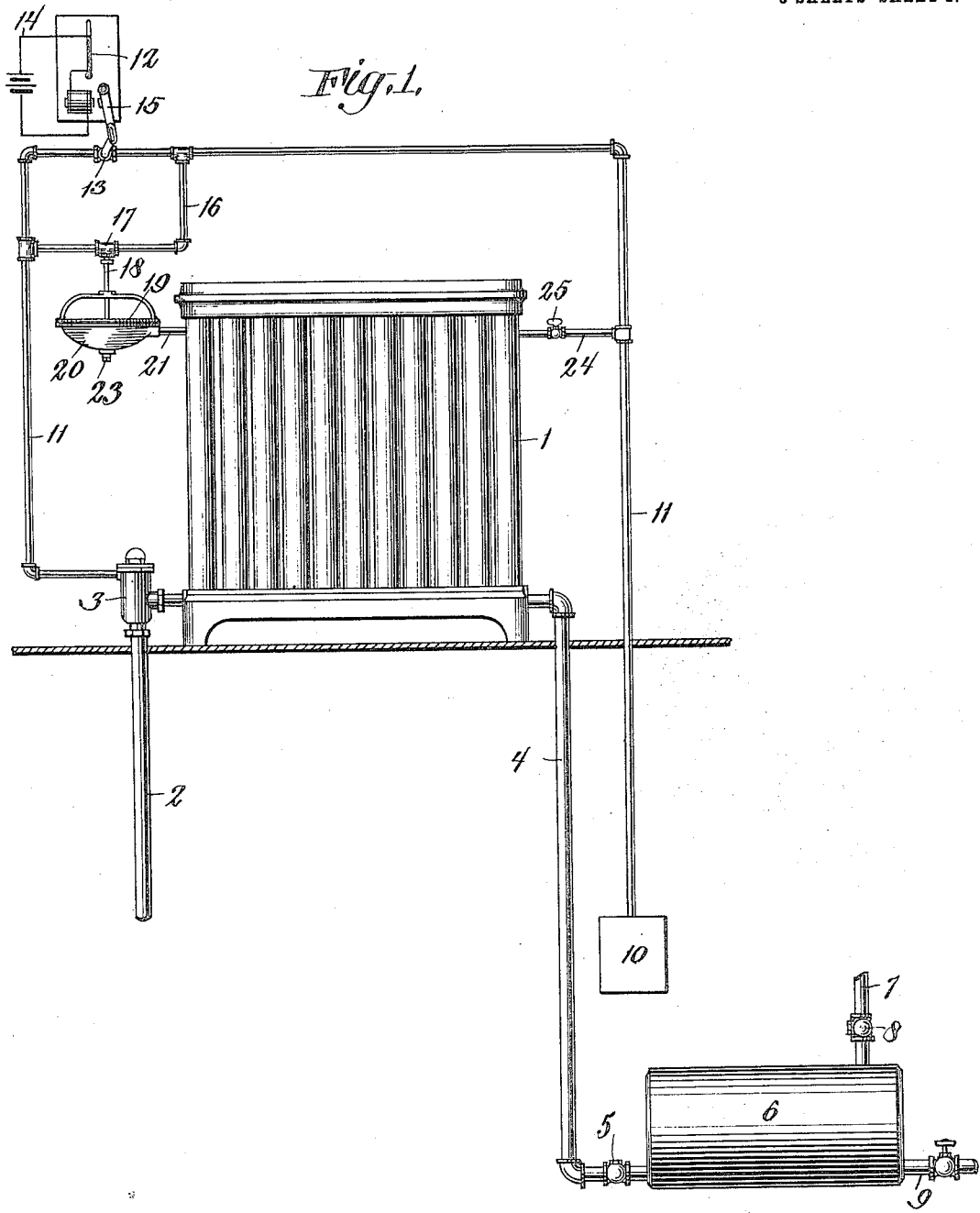

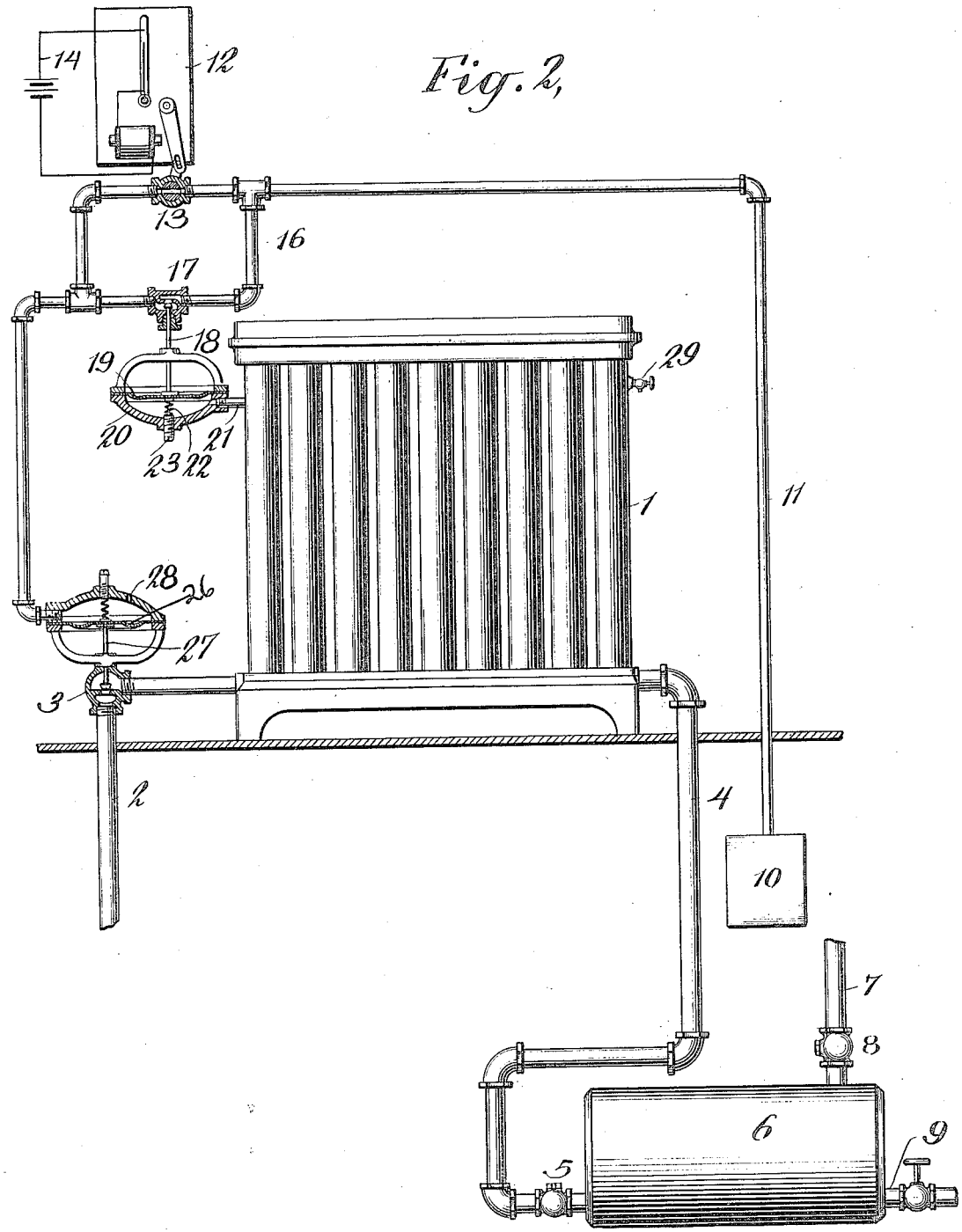

UNITED STATES PATENT OFFICE.

ANDREW G. PAUL, OF BOSTON, MASSACHUSETTS.

HEATING SYSTEM.

1,045,603.  Specification of Letters Patent.  Patented Nov. 26, 1912.

Application filed May 15, 1900. Serial No. 16,813.

*To all whom it may concern:*

Be it known that I, ANDREW G. PAUL, a citizen of the United States, residing in Boston, in the county of Suffolk and State of Massachusetts, have invented a new and useful Improvement in Heating Systems, of which the following is a full, clear, and exact specification, reference being had to the accompanying drawings, which form a part hereof.

This invention relates to a heating system wherein steam or other suitable heating agent is circulated for the purpose of conveying and imparting heat to the places desired, and it consists in an improved construction and arrangement of the parts of such a system.

One object of my invention is to automatically control the operation of the system by means of the pressure of the heating vehicle within the system.

Another object of the invention is to automatically and positively control the supply of the heating vehicle to the system and the discharge of air and the water of condensation therefrom.

Another object of the invention is to cause the operation of the system to be controlled by the temperature of the room or apartment which is being warmed.

Another object of the invention is to regulate and control automatically the work which is done by the system after the temperature of the room or apartment has been raised to the required degree.

My invention consists first in the combination in a heating system of means for controlling the operation of the same, such as a valve upon the supply pipe, or any other valve or means of any nature whatsoever for regulating the effective heating work done by the system, a motor or movable element controlling said means, a fluid pressure chamber on one side of said motor, a vent for said chamber, a fluid pressure device which may be either an exhauster or a device to supply fluid under pressure, a pipe connecting the fluid pressure device and the fluid pressure chamber, a thermostat controlling the said pipe, a by-pass around said thermostat, means for controlling said by-pass, said means being connected with the system so as to be operated thereby. In the best form of my invention the by-pass is controlled by a piston or diaphragm which is operated by the pressure within the system. In the best form of my invention also the valve upon the supply pipe is operated by means of the fluid pressure device so as to regulate the amount of heating vehicle supplied to the system.

My invention also consists in combining with some or all of the parts above mentioned, a thermostat placed in operative connection with the system and adapted to control the by-pass. In the best form of my invention this thermostat is made adjustable along the surface of the radiator or heater so that it can be applied at any point thereon that may be desirable.

My invention consists in certain other features of construction and combinations of parts hereinafter described and claimed.

In the accompanying drawings Figure 1 shows my improved system of steam heating having upon the supply pipe my improved form of valve claimed in my prior Patent No. 899,838, dated September 29, 1908; Fig. 2 shows a similar system in which the supply valve, however, is made in any usual form and is controlled by a diaphragm; Fig. 3 shows my preferred form of the present invention having my improved valve upon the supply pipe and having upon the return pipe the improved form of valve shown in my Patent No. 771,744, and also showing a thermostat adapted to be adjusted along the surface of the radiator and adapted to control the by-pass. Fig. 4 is a sectional view of the valve in the by-pass and of the movable device controlling the same.

Similar numbers indicate similar parts in the different figures.

In Fig. 1, 1 is a radiator of any suitable form. 2 is a supply pipe, 3 is a supply valve, 4 is the return pipe provided with a check valve 5; 6 is a tank for the water of condensation; 7 is the relief pipe provided with any suitable form of valve 8; 9 is a pipe through which the water of condensation may be pumped to the boiler or any other suitable point. 10 is a fluid pressure device. I prefer to use any suitable form of exhausting device for this purpose, although a pump or other apparatus to supply fluid under pressure may also be used. 11 is a pipe connecting the fluid pressure device with the fluid pressure chamber of the supply valve. 12 is a thermostat of any suitable form adapted to operate the valve 13 on the connecting pipe 11. The thermostat is adapted to be placed upon the wall of the room or in any other desired position, and is connected with the valve 13 by any suitable means such, for example, as the circuit 14 including a battery and electro-magnet and an armature 15 connected with the valve 13 so as to operate the same. 16 is a by-pass around the valve 13 provided with a valve 17. This valve is preferably made in the form shown in Fig. 4 and is connected by means of the rod 18 with the motor or diaphragm 19. 20, see Fig. 4, is a fluid pressure chamber on the under side of the motor. 21 is a pipe or passage connecting this fluid pressure chamber with the radiator. 22 is a spring adapted to press the diaphragm upward and thereby to close the valve 17. The tension of the spring 22 can be regulated by the screw 23. The supply valve 3, as already explained, is preferably made in the form shown in my previous patent already mentioned, and is provided with a piston 40 connected with and operating the supply valve above which piston is the fluid pressure chamber 41, and between the piston and the casing there is an equalizing passage 42 connecting the chambers on the two sides of the piston. The equalizing passage acts as a vent for the fluid pressure chamber. 24 is an air pipe connecting the radiator with the pipe 11. This connection is used only when the fluid pressure device is an exhauster. The pipe 24 is provided with the usual automatic air valve 25. The operation of this form of system is as follows: The thermostat is placed at any suitable part of the room which is to be heated. If the temperature of the room is below the desired or predetermined point, the circuit 14 is broken and as a result of this the valve 13 is opened as shown in Fig. 1. As a result of this the exhauster 10 operating through the pipe 11, will keep the supply valve open and the radiator will be filled with the heating vehicle and the system will work at its full capacity until the temperature of the room is brought to the desired point. As soon as this happens the circuit 14 will be closed by the thermostat and the valve 13 will be closed. The pressures on the opposite sides of the piston of the supply valve will equalize, and the supply valve will close. The heating vehicle will thus be shut off from the radiator. As soon as the pressure within the radiator falls below the desired or predetermined point, this decrease of pressure which will extend into the fluid pressure chamber 20 underneath the diaphragm 19, will cause this diaphragm to move downward, thus opening the valve 17. As soon as the device 10 operating through the pipe 11 and the by-pass 16, will again open the supply valve, thus admitting a fresh quantity of the heating vehicle. The supply valve will remain open until the pressure in the radiator is restored to the desired point, when the valve 17 will be closed and thus cause the supply valve to close. In this way the pressure within the heating system can be maintained at any point desired, and thus the effective heating work done by the radiator after the room has been heated to the predetermined point, can be accurately controlled. It is desirable, after the room has been heated to the point desired, to cause the heating system to continue its work of heating sufficiently to maintain the room at that temperature, but to check its operation so as to prevent overheating. This is done automatically and economically by my improvement. Whenever the temperature of the room falls below the point desired, the valve 13 is opened and the system is at once brought into full operation until the temperature is restored. The air is removed from the radiator through the air pipe 24 in the well known manner.

It is manifest, as already stated, that instead of using as an exhauster, an apparatus for supplying fluid under pressure could be used to move the supply valve, the valve being suitably constructed for this purpose.

In Fig. 2 the parts are constructed and arranged as already explained except that a supply valve 3 is operated by a diaphragm 26 through and by means of the valve stem 27, which is suitably connected to the diaphragm. The fluid pressure chamber above the diaphragm is provided with any suitable vent 28. In place of the air pipe shown in Fig. 1, an ordinary petcock 29 is shown adapted to permit the escape of air. In place of this petcock an air pipe could be connected with the pipe 11, as already explained, the air pipe being provided with a suitable air valve. The operation of this system is the same as that already explained in connection with the system shown in Fig. 1, except that when the valves 13 and 17 are closed the atmospheric pressure enters the fluid pressure chamber above the diaphragm 26 through the vent 28, and thus causes the supply valve to close. When the system is started the petcock 29 must be opened to permit the escape of air.

In Fig. 3 the parts are the same as already explained in connection with the previous figures, with the following differences. The supply valve is similar to that shown in Fig. 1. The discharge pipe is provided with a discharge valve 30 which is similar in form to my improved discharge valve covered in my Patent No. 771,744. This valve is adapted to automatically and positively secure the discharge of air and the water of condensation from the system. The discharge valve comprises a piston 300, pressed in one direction by a spring 301 and a passage 302, as will appear more fully by reference to my patent above referred to. When any considerable amount of water of condensation collects in the lower part of the valve device the water operates to seal the passage around the piston 300 as a result of which the exhauster produces a minus pressure in the chamber above the piston through the passage 302 which causes the piston to rise and thus open the valve. The pipe 11 is connected with the side passage of the valve 30. This pipe 11 could, if preferred, be connected directly with the discharge pipe 4. 31 is an exhauster preferably in the form of a jet connected with the discharge pipe 4. 32 is any suitable form of valve for cutting out the exhauster. 33 is a cock on the tank for the water of condensation by which the water may be removed from said tank. 34 is a thermostat of any suitable form adapted to be adjusted along the surface of the radiator so as to be placed in operative connection with, or close proximity to, any part of the radiator. This thermostat is connected by any suitable means, such as an electric circuit, with a valve 35 on the by-pass. When this thermostat is put upon any particular tube of the radiator, and that tube becomes heated, the thermostat closes the circuit and thereby closes the valve 35, as a result of which the supply valve 3 is closed in the manner already explained. The operation of this system is substantially the same as that already explained, with the following exceptions. As the exhauster is connected with the discharge pipe, and that discharge pipe is provided with my improved discharge valve, the air and water of condensation are positively and automatically removed from the radiator through the said discharge valve. The same exhausting apparatus is made to operate the supply valve and the discharge valve. When the room has been heated to the desired point, the valve 13 is closed. As the heating vehicle in the radiator at this time is under the same pressure as the supply, and as the thermostat 34 is also heated so as to be expanded at this time, both the valves 17 and 35 of the by-pass are closed. The radiator gradually cools and the pressure is reduced. As soon as the pressure in the radiator falls below the desired point, the valve 17 is opened in the manner already explained. When the thermostat 34 becomes cooled by reason of the cooling of the tube against which it is placed, the valve 35 is also opened and the fluid pressure device operating through the pipe 11 and the by-pass 16, opens the supply valve on the radiator and permits a fresh quantity of the heating vehicle to enter the same. As soon as the heating vehicle reaches the thermostat 34, the thermostat is again expanded, closing the valve 35. For this reason only that part of the radiator between the thermostat 34 and the supply end, is kept in operation, so long as the room to be heated remains at the desired temperature. Furthermore, if before the thermostat 34 is expanded the pressure at the supply end of the radiator rises above the predetermined point, the valve 17 is closed, as a result of which the supply valve is closed. Consequently the part of the radiator which is kept in operation is limited by the thermostat 34 and at the same time the pressure of the heating vehicle in that part of the radiator is kept below the predetermined point.

Some of the advantages of my invention are as follows. The full heating capacity of the system is availed of until the room has been heated to the desired temperature. As soon as this result has been secured the effective heating capacity of the system is reduced and kept substantially at a predetermined degree of efficiency. The amount of heating surface of the radiator which is brought into operation, is regulated and controlled and at the same time the pressure in the same is regulated and controlled. In this manner a very nice and accurate and finely regulated control of the system can be secured, and all danger of overheating or fluctuations or radical changes in the temperature can be avoided.

What I claim as new and desire to secure by Letters Patent, is:

1. The combination with a heating system, of means for controlling the operation of the same, a casing provided with a movable element controlling said means and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve, a valve in said by-pass, means for controlling said valve in said by-pass, said means being connected with the system so as to be operated thereby, substantially as set forth.

2. The combination with a heating system of means for controlling the operation of the same, a casing provided with a movable element controlling said means and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve, a valve in said by-pass, a motor for controlling said valve in said by-pass and connected with the system so as to be operated thereby, substantially as set forth.

3. The combination with a heating system of means for controlling the operation of the same, a casing provided with a movable element controlling said means and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve, a valve in said by-pass, a motor for controlling said valve in said by-pass, the motor being provided with a fluid pressure chamber on one side thereof and a passage connecting the said last-named fluid pressure chamber with the heater or radiator, substantially as set forth.

4. The combination with a heating system of a supply pipe, a valve on the supply pipe, a casing provided with a movable element controlling said valve and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve, a valve in said by-pass, means for controlling said valve in said by-pass, said means being connected with the system so as to be operated thereby, substantially as set forth.

5. The combination with a heating system of a supply pipe, a valve on the supply pipe, a casing provided with a movable element controlling said valve and forming therewith a fluid pressure chamber and having a vent for said chamber, a fluid pressure device, a pipe connecting the fluid pressure device and the fluid pressure chamber, a valve in said pipe a thermostat controlling said valve, a by-pass around said valve, a valve in said by-pass, a motor for controlling said valve in said by-pass and connected with the system so as to be operated thereby, substantially as set forth.

6. The combination with a heating system of a supply pipe, a valve on the supply pipe, a casing provided with a movable element controlling said valve and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve, a valve in said by-pass, a motor for controlling said valve in said by-pass, the motor being provided with a fluid pressure chamber on one side thereof, and a passage connecting the said fluid pressure chamber with the heater or radiator, substantially as set forth.

7. The combination with a heating system of means for controlling the operation of the same, a casing provided with a movable element controlling said means and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve, a valve in said by-pass, a motor for controlling said valve in said by-pass and connected with the system so as to be operated thereby, a second thermostat adapted to be placed in operative connection with the system so as to control the valve in said by-pass, substantially as set forth.

8. The combination with a heating system of means for controlling the operation of the same, a casing provided with a movable element controlling said means and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve, a valve in said by-pass, a motor for controlling said valve in said by-pass and connected with the system so as to be operated thereby, a second valve in said by-pass and a second thermostat adapted to be placed in close proximity to some intermediate part of the system and to operate said second valve, substantially as set forth.

9. The combination with a heating system, of a valve for controlling the flow of the heating vehicle thereto, a casing provided with a movable element controlling said valve and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve a valve in said by-pass, a motor for controlling said valve in said by-pass, a pipe connecting the motor with some part of the system whereby the motor is operated by the pressure in the system, a second valve in said by-pass, a second thermostat adapted to control said second valve, said second thermostat being adapted to be applied to an intermediate part of the heating system or to be disconnected therefrom, substantially as set forth.

10. The combination with a heating system of a supply pipe, a valve on the supply pipe, a casing provided with a movable element controlling said supply valve and forming therewith a fluid pressure chamber and having a vent for said chamber, a fluid pressure device, a pipe connecting the fluid pressure device and the fluid pressure chamber, a valve in said pipe, a thermostat controlling said valve, a by-pass around said valve, a valve in said by-pass, a motor for controlling said valve, and connected with the system so as to be operated thereby, a second valve in the by-pass and a second thermostat adjustable along the radiator or system, and adapted to control the second valve in the by-pass, substantially as set forth.

11. The combination with a heating system, of a supply pipe, a valve on the supply pipe, a casing provided with a movable element controlling said supply valve and forming therewith a fluid pressure chamber and having a vent for said chamber, a discharge pipe, a discharge valve, a casing for said discharge valve, a piston controlling said discharge valve, the casing of said discharge valve being provided with a fluid pressure chamber at one side of said piston a chamber on the opposite side of said piston and an air passage connecting the fluid pressure chamber with the chamber on the other side of said piston, a passage connecting the fluid pressure chamber of the discharge valve with the discharge pipe, an exhausting device connecting with the discharge pipe, a pipe one end of which is connected with the fluid pressure chamber of the supply valve and the other end of which is operatively connected with the exhausting device a valve in said pipe, a thermostat controlling said last mentioned valve, a by-pass around said valve a valve in said by-pass, a motor for controlling said valve in said by-pass and a pipe connecting the motor with the system so as to be operated by the pressure therefrom substantially as set forth.

In testimony whereof, I have signed my name to this specification, in the presence of two subscribing witnesses.

ANDREW G. PAUL.

Witnesses:
THOMAS K. PETERS,
NANNIE FINLEY.